United States Patent
Teixeira et al.

(10) Patent No.: US 9,835,143 B2
(45) Date of Patent: Dec. 5, 2017

(54) OCEAN THERMAL ENERGY CONVERSION METHOD AND SYSTEM

(75) Inventors: David Teixeira, Rueil-Malmaison (FR); Claude Mabile, Clamart (FR)

(73) Assignee: IFP ENERGIES NOUVELLES, Rueil-Malmaison (FR)

(*) Notice: Subject to any disclaimer, the term of this patent is extended or adjusted under 35 U.S.C. 154(b) by 270 days.

(21) Appl. No.: 14/349,082

(22) PCT Filed: Sep. 11, 2012

(86) PCT No.: PCT/FR2012/000359
§ 371 (c)(1),
(2), (4) Date: Jun. 17, 2014

(87) PCT Pub. No.: WO2013/050666
PCT Pub. Date: Apr. 11, 2013

(65) Prior Publication Data
US 2015/0052894 A1 Feb. 26, 2015

(30) Foreign Application Priority Data
Oct. 7, 2011 (FR) ...................................... 11 03076

(51) Int. Cl.
 F03G 7/05 (2006.01)
 F01K 19/02 (2006.01)
 F01K 7/22 (2006.01)

(52) U.S. Cl.
 CPC ................. *F03G 7/05* (2013.01); *F01K 7/22* (2013.01); *F01K 19/02* (2013.01); *Y02E 10/34* (2013.01)

(58) Field of Classification Search
 CPC ........ F03G 7/05; F03G 2007/007; F03G 7/04; Y02E 10/34; F01K 3/265; F01K 7/22; F01K 17/005; F01K 17/06; F01K 19/02; F01K 19/04
 See application file for complete search history.

(56) References Cited

U.S. PATENT DOCUMENTS

| | | | | |
|---|---|---|---|---|
| 3,842,605 A | * | 10/1974 | Tegtmeyer | F01K 7/22 60/678 |
| 3,992,884 A | * | 11/1976 | Pacault | F01K 19/02 376/402 |
| 4,110,628 A | * | 8/1978 | Paull | E21B 43/01 114/264 |

(Continued)

FOREIGN PATENT DOCUMENTS

WO WO2008/042893 A2 4/2008

*Primary Examiner* — Mark Laurenzi
*Assistant Examiner* — Xiaoting Hu
(74) *Attorney, Agent, or Firm* — Fitch, Even, Tabin & Flannery LLP

(57) ABSTRACT

The invention is an ocean thermal energy conversion method and a system in which a motive fluid having predetermined characteristics is circulated in a closed loop between a cold source in cold deep ocean water and heat sources in warm surface water. The motive fluid is compressed between the cold source and a first primary warm water heat source resulting in the motive fluid being substantially totally vaporized at an outlet of the warm water heat source. The motive fluid is heated downstream from the primary heat source by a secondary heat source. The thermal energy of the heated motive fluid is recovered from a turbine and the motive fluid is condensed in the cold source.

4 Claims, 3 Drawing Sheets

(56) References Cited

U.S. PATENT DOCUMENTS

| | | | |
|---|---|---|---|
| 8,572,967 B1 * | 11/2013 | Cowden | F03G 7/05 60/641.7 |
| 8,656,720 B1 * | 2/2014 | Hardgrave | F01K 7/34 60/641.2 |
| 2007/0289303 A1 * | 12/2007 | Prueitt | F03G 7/05 60/641.7 |
| 2008/0127657 A1 * | 6/2008 | Fang | F01K 25/10 62/79 |
| 2009/0077969 A1 * | 3/2009 | Prueitt | B01B 1/005 60/641.7 |
| 2009/0294110 A1 | 12/2009 | Foust | |
| 2010/0139271 A1 | 6/2010 | Howard et al. | |
| 2010/0205961 A1 | 8/2010 | Nagurny | |
| 2011/0309635 A1 * | 12/2011 | Sardo | F01K 25/08 290/1 A |

\* cited by examiner

OCEAN THERMAL ENERGY CONVERSION METHOD AND SYSTEM

CROSS REFERENCE TO RELATED APPLICATION

Reference is made to French Application Serial No. 11/03.076, filed Oct. 7, 2011, which application is incorporated herein by reference in its entirety.

BACKGROUND OF THE INVENTION

Field of the Invention

The present invention relates to Ocean Thermal Energy Conversion (OTEC) involving energy obtained using the temperature difference existing in tropical and subtropical regions between surface ocean waters and deep ocean waters, in particular at depths of the order of 1000 m. Surface waters are used for the heat source and deep waters for the cold source of a motive thermodynamic cycle. Given that the temperature difference between the heat source and the cold source is relatively low, the expected energy yields are also low.

DESCRIPTION OF THE INVENTION

Conventional OTEC plants generally work on a Rankine cycle. A variant of this cycle with superheating is known as the Him cycle. The Hirn cycle heats the motive fluid to a temperature sufficient for it to be still gaseous after expansion. However, these plants do not involve maximum optimization in the field of the invention.

SUMMARY OF THE INVENTION

The present invention is an ocean thermal energy conversion method comprising:
circulating a motive fluid having predetermined characteristics in a closed loop between a cold source and a heat source and the sources are respectively a heat exchanger disposed between a motive fluid and cold deep ocean water, and a heat exchanger disposed between the motive fluid and the warm surface ocean water;
compressing the motive fluid between the cold source and the heat source so that in consideration of the thermodynamic conditions of the sources and the nature of the motive fluid, the motive fluid is a substantially totally vaporized motive fluid at the heat source outlet;
heating the vaporized motive fluid is downstream from the heat source;
recovering thermal energy of the vaporized heated motive fluid from a turbine; and
condensing the motive fluid in the cold source.

The invention increases the heat source temperature at a lower cost which considerably improves (and even doubles) the efficiency of a conventional OTEC plant, and thus the profitability thereof. It also allows the area of implementation of a plant of the present invention to be extended, which increases the potential market.

The invention optimizes an ocean energy recovery system by basing the design of the plant on prevailing temperatures for cold deep ocean water to provide a cold ocean water source and warm surface ocean water to provide a warm water source providing primary heating from the warm surface ocean water which functions as a heat source causing substantial to total vaporization of the motive fluid and a secondary source providing complementary heating of the substantially to totally vaporized motive fluid.

The thermal energy of the vaporized and heated motive fluid can be recovered through two turbine stages, and the motive fluid can be heated between the two turbine stages by heat exchange between the motive fluid and the warm surface ocean water. The motive fluid can be heated between the two turbine stages by heat exchange between the motive fluid and a motive fluid portion withdrawn downstream from the second turbine with the portion being recombined, after expansion, in the main motive fluid circuit.

The vaporized motive fluid can be heated downstream from the heat source by a heat pump whose heat source is from heat exchange with the warm surface ocean water.

The cold source can be a closed loop of a refrigerant fluid that exchanges thermally with the cold deep ocean water.

The invention also relates to an ocean thermal energy conversion system comprising:
means for providing closed-loop circulation of a motive fluid having predetermined characteristics between a cold source and a heat source with the sources being respectively a heat exchanger between the motive fluid and a fluid at the temperature of the cold deep ocean water and a heat exchanger between the motive fluid and a fluid at the temperature of the warm surface ocean water;
means for compressing the motive fluid between the cold source and the heat source so that, (considering the thermodynamic conditions of the sources and the nature of the motive fluid,) the motive fluid is substantially totally vaporized at an outlet of the heat source;
means for providing secondary heating of the vaporized motive fluid, downstream from the heat source;
means for recovering the thermal energy of the vaporized heated motive fluid;
means for condensing the motive fluid in the cold source.

The means for recovering the thermal energy of the vaporized and heated motive fluid can comprise two turbine stages and a heat exchanger between the motive fluid and a fluid at the temperature of the warm surface ocean water, wherein the heat exchanger is disposed between the two turbine stages. The heat exchanger disposed between the two turbine stages can be a heat exchanger between the motive fluid and a portion of motive fluid withdrawn downstream from the second turbine by a flow splitter, compressed in a compressor and then, after expansion in a valve the portion is recombined in the main motive fluid circuit by a mixer.

The means for providing secondary heating can comprise a heat pump having a heat source which is a heat exchanger exchanging heat with the warm surface ocean water.

The cold source can comprise a closed loop of a refrigerant fluid that provides thermal exchange with cold deep ocean water.

The plant design is based on the means used to obtain a specific heating method during the engine cycle, in particular in such a way that the heating energy from the surface water vaporizes the motive fluid and that the secondary heat source specific to the vaporized motive fluid provides an additional energy level that allows the cycle efficiency to be increased.

The present invention is not limited to Rankine cycles. All of the thermodynamic cycles used by OTEC plants can be advantageously improved by the invention.

The invention's "distributing the motive fluid heating work" among the warm ocean water (inexpensive) and an additional heat source allows good adjustability of the system according to the invention to local situations, with a higher profitability.

BRIEF DESCRIPTION OF THE DRAWINGS

Other features and advantages of the present invention will be clear from reading the description hereafter of embodiments given by way of non limitative example, with reference to the accompanying figures wherein.

DETAILED DESCRIPTION OF THE INVENTION

The invention is thus based on a distribution of the work among the warm water and an additional heat source. The principle of operation is as follows: the inexpensive warm ocean water provides vaporization of the working fluid, then another heat source increases the temperature thereof.

The thermodynamic cycle is obtained in accordance with the following reasoning. The pressure of the cold source, which is deep ocean water, is provided by the temperature thereof. Indeed, the pressure must be sufficient for the cold source to be able to condense the working fluid simply by lowering the temperature thereof.

Once pressure $P_{cold}$ of the cold source is determined, the point of intersection between the isentrope passing through $T_{cold}$ and $P_{cold}$ (gaseous) and the horizontal line whose temperature is $T_{warm\ water}$ in the bell of the enthalpy diagram is determined. The pressure of the heat source is thus obtained and the point of intersection gives temperature $T_{warm}$ that optimizes the system.

Figure 1:
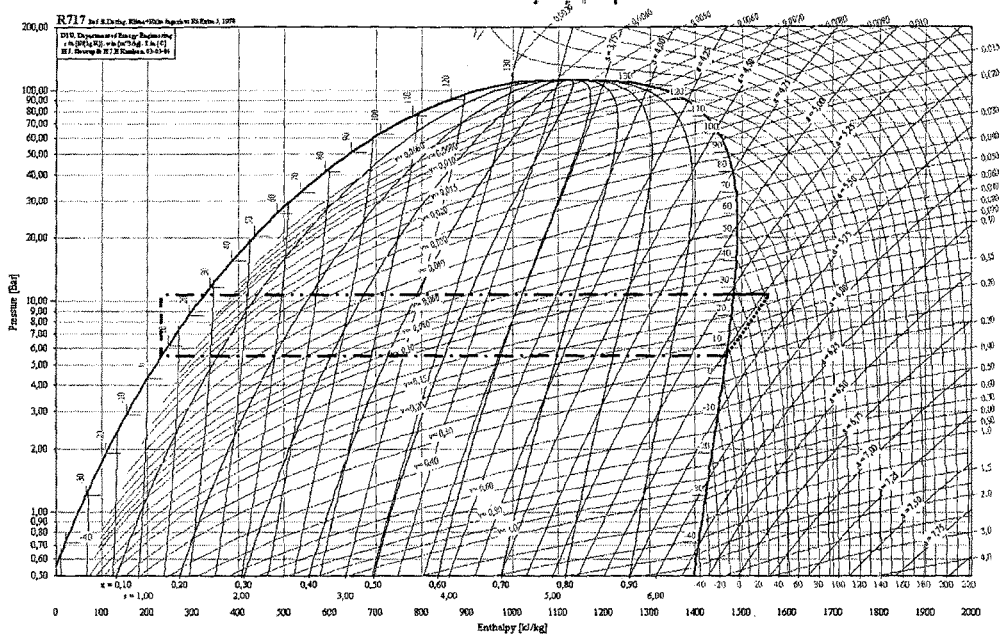
FIG. 1 is a representation of the thermodynamic cycle of an OTEC plant whose heat source is improved in an enthalpy diagram.

According to this reasoning and by taking 303 K and 278 K as the warm and cold water temperatures respectively, the thermodynamic cycle of FIG. 1 is obtained from ammonia being the working fluid.

Figure 2:
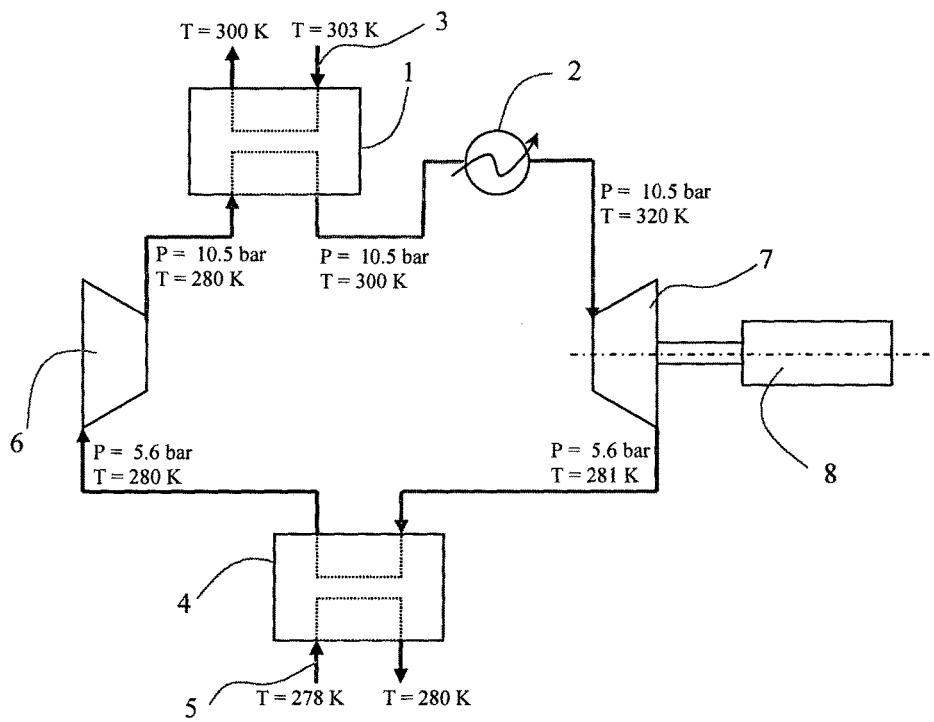
FIG. 2 diagrammatically shows a system for implementing the invention.

FIG. 2 shows the block diagram of an OTEC plant working on a Rankine cycle and comprising a heat source exchanger 1 and a secondary heat source 2. The secondary heat source can be provided by any source providing a temperature higher than the surface ocean water temperature (reference 3) and sufficient to improve the thermodynamic cycle.

The system comprises a cold source exchanger 4 from cold ocean water (reference 5) taken from deep waters. Similarly, without departing from the present invention, a refrigerant fluid carrying the deep ocean water energy to the cold source exchanger can be used. The circuit of the motive fluid, which is ammonia in the present example, comprises a compressor 6 and a turbine 7 driving a generator 8.

The pressure (P in bar) and temperature (T in Kelvin) values depend on the cold water and warm water temperatures, and on the nature of the motive fluid that is practically totally vaporized at the heat source exchanger outlet.

An alternative of the method similarly provides "distributing the work" among the warm water and an additional heat source, but with the invention allowing the energy supplied by the secondary heat source to be decreased.

The thermodynamic cycle, for ammonia, is obtained with the following process:

As above, the pressure of the cold source is provided by the temperature thereof. Indeed, the pressure must be sufficient for the cold source to be able to condense the working fluid simply by lowering the temperature thereof.

Once pressure $P_{cold}$ of the cold source is determined, the point of intersection between the isentrope passing through $T_{cold}$ and $P_{cold}$ (gaseous) and the isotherm at the warm water temperature is determined in order to obtain the second stage of the cycle. The intersection allows the intermediate pressure to be determined. From this last point, the isobar is followed up to the phase change start curve. The outlet pressure and temperature of the first stage are thus obtained.

The intersection between the isentrope passing through the last point and the horizontal line whose temperature is $T_{warm\ water}$ is then determined in the bell of the enthalpy diagram. The first stage of the cycle is thus obtained. This intersection allows the high pressure to be determined.

Figure 3:
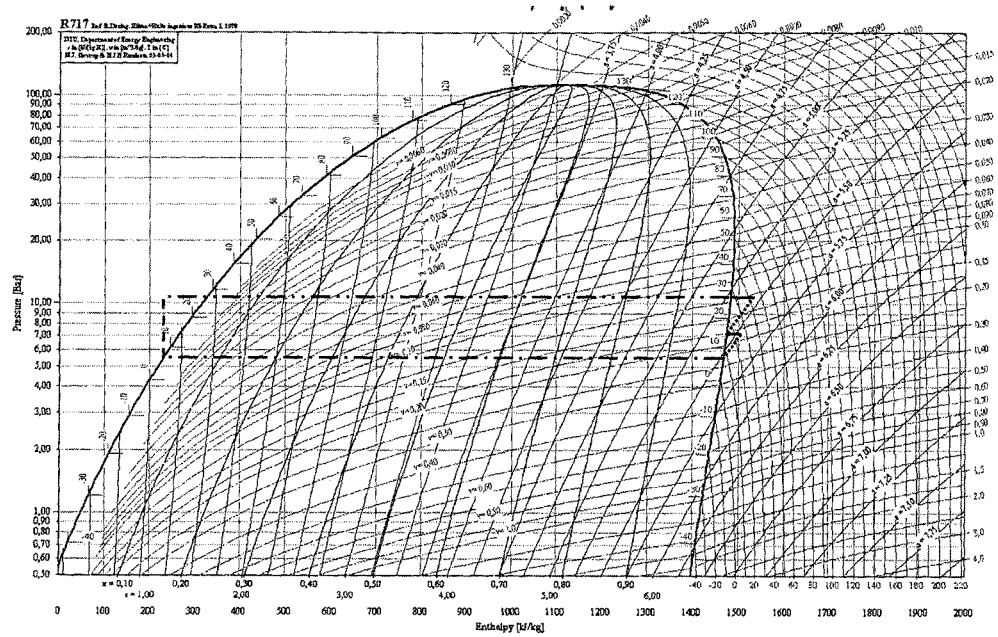
FIG. 3 is an alternative embodiment which is a representation of the thermodynamic cycle of an OTEC plant having a heat source with an improved enthalpy diagram.

Considering the warm and cold water temperatures of 303 K and 278 K respectively, the new thermodynamic cycle is obtained with ammonia as the working fluid as shown in FIG. 3.

Figure 4:
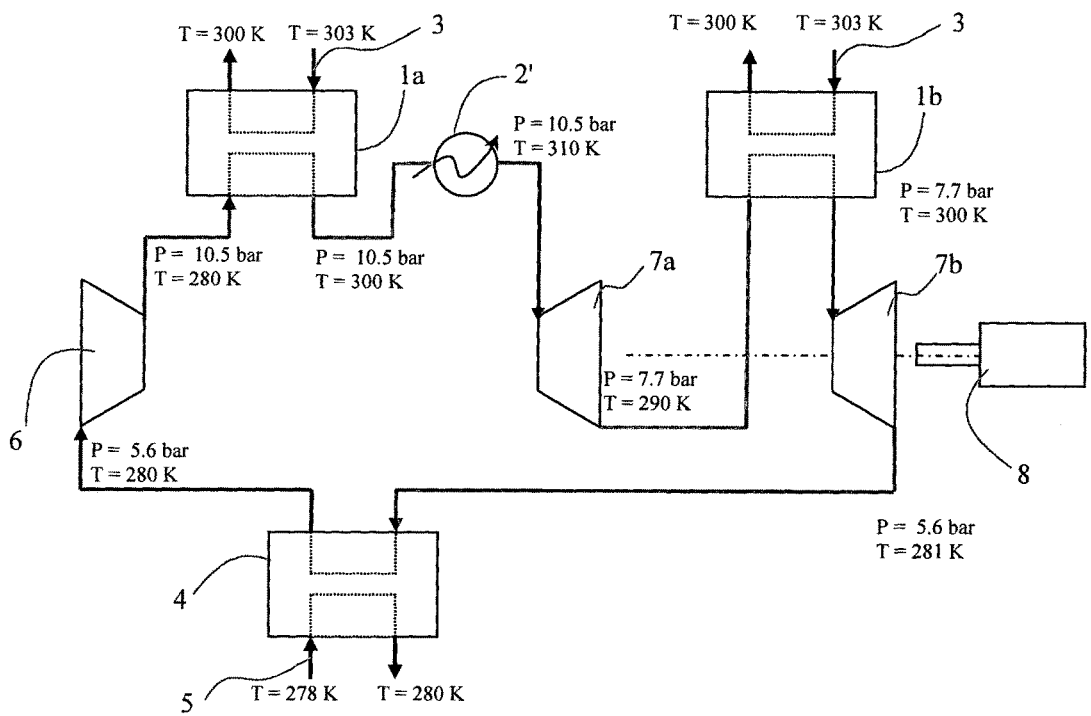
FIG. 4 diagrammatically shows an alternative embodiment of the system according to the invention.

This alternative embodiment can be considered to recover power over several expansion stages. The goal is to decrease the energy supplied by secondary heat source 2'. FIG. 4 shows a system with two energy recovery stages. In the case of such a plant, the circuit of the motive fluid which is ammonia here is the same temperature as the inlet of cold source exchanger 4 and the outlet of heat source exchanger 1a. Downstream from this exchanger, the circuit comprises a secondary heat source 2' that, in this alternative, provides less energy. In this example, it provides only half the energy in relation to the system of FIG. 2. After this secondary heat source 2', the fluid is expanded in a first turbine 7a. Since the temperature of the motive fluid is lower than in the single-stage case, the expansion rate is lower. The power recovered is also lower. In this example, half the power recovered is from the system of FIG. 2. At the outlet of this first turbine 7a (HP), the motive fluid is heated in a heat source exchanger 1b of the $2^{nd}$ stage. It is then expanded in a second turbine 7b (LP). In the example, the second turbine allows recovery of the same amount of power as the first turbine 7a. Each turbine can drive an electric generator, or both turbines can be arranged on a single shaft of the same generator. Thus, this alternative embodiment illustrates a method eventually providing recovery of the same amount of energy as the system of FIG. 2, and advantageously requires less power to be required from the secondary heat source.

EXAMPLES

Table 1 gives the ammonia, warm surface ocean water and cold deep ocean water flow rates for a 10-MW OTEC plant without secondary heat source.

TABLE 1

| Ammonia flow rate | Warm water flow rate | Cold water flow rate |
| --- | --- | --- |
| 0.25 t/s | 27 t/s | 38 t/s |

Table 2 gives the powers involved in the various circuit elements of the system of a conventional plant. The compressor and turbine efficiencies were set at 0.9.

TABLE 2

| Compressor | Turbine | Cold source | Heat source | Overall efficiency |
|---|---|---|---|---|
| 0.093 MW | 10.045 MW | 312 MW | 322 MW | 3.1% |

Table 3 shows the powers involved and the overall efficiency of the cycle of a plant with secondary heat source allowing verification of the temperature and pressure conditions given in FIG. 2. The water and ammonia flow rates are the same as for the conventional plant of FIG. 1.

TABLE 3

| Compressor | Turbine | Cold source | Heat source | Heat source 2 | Efficiency |
|---|---|---|---|---|---|
| 0.22 MW | 20.4 MW | 312 MW | 322 MW | 10.6 MW | 6.1% |

It can be seen that supplying approximately 10 MW heat (corresponding to 3% of the heat source) allows doubling of the efficiency, and especially doubling of the power recovered by the turbine. Practically all of the power delivered by the second heat source is converted to work in the turbine.

Note: efficiency $\eta$ is defined as $\eta = \dfrac{W_{Turbine}}{Q_{Warm}}$
$$= \dfrac{W_{Turbine}}{Q_{Warm\_1} + Q_{Warm\_2}}.$$

Two-Stage Alternative Embodiment

Table 4 gives the powers involved and the overall efficiency of the cycle of a two-stage plant with secondary heat source, allowing verification of the temperature and the pressure conditions of FIG. 4. The water and ammonia flow rates are the same as for the conventional plant. The references correspond to those of FIG. 4.

TABLE 4

| Compressor (6) | HP turbine (7a) | LP turbine (7b) | Cold source (4) | Heat source (1a) | Heat source (2') | Heat source (1b) | Efficiency η |
|---|---|---|---|---|---|---|---|
| 0.22 MW | 10.1 MW | 10.0 MW | 312 MW | 322 MW | 4.8 MW | 5.4 MW | 6.1% |

It can be seen that the energy provided by the secondary heat source is divided in half, whereas the overall efficiency is the same.

Efficiency $\eta$ is defined as $\eta = \dfrac{W_{Turbine}}{Q_{Warm}}$
$$= \dfrac{W_{Turbine}}{Q_{Warm\_1} + Q_{Warm\_2} + Q_{Warm\_3}}.$$

Secondary Heat Sources

Although the secondary heat source can be provided by many known means (from fossil fuels or renewable energy sources), using a heat pump is particularly advantageous in the field of OTEC where cold and heat sources are available.

A heat pump (PAC) is a thermodynamic device allowing heat to be transferred from the colder medium (which therefore becomes even colder) to the warmer medium (which is thus heated), whereas heat naturally diffuses from the warmer to the colder medium until equality of temperature is reached. The efficiency $\eta_{pac}$ of heat pumps is defined as follows:

$$\eta_{pac} = \dfrac{Q_{Warm}}{W_{pac}}$$

where $W_{pac}$ is the power supplied at the heat pump. The efficiency can reach values of 7 in the best case.

In the present case, heat pump PAC can have the warm ocean water as the cold source and thus can supply heat 24 hours a day. However, the heat pump has its own energy consumption to operate its compressor. This inevitably decreases the efficiency of the device.

Figure 5:
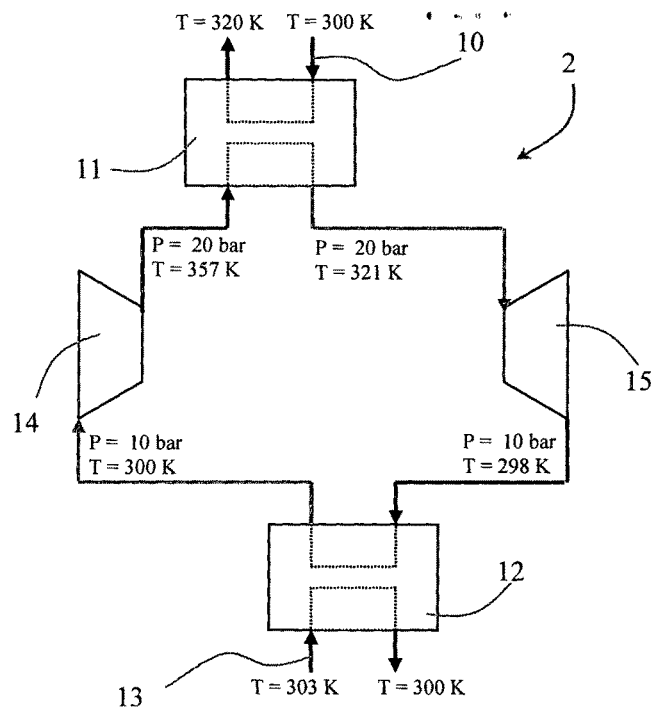
FIG. 5 illustrates a heat pump.

FIG. 5 shows the diagram of a heat pump PAC whose working fluid is ammonia which provides 10 MWt at 320 K, depending on the secondary heating element 2 integrated in the circuit of FIG. 2. Reference 10 corresponds to the circuit of the motive fluid of the main circuit that is heated by this heat source 2 (PAC) in a "cold source" exchanger 11. "Heat source" exchanger 12 collects the thermal energy from the warm surface ocean water 13. Heat pump PAC comprises a compressor 14 and an expansion valve 15.

Table 5 gives the calculation results for the powers of the elements, the flow rates and the efficiency of the heat pump, according to the conditions implemented in the diagram of the heat pump circuit of FIG. 5.

TABLE 5

| Compressor | Cold source | Heat source | Flow rate | Efficiency |
|---|---|---|---|---|
| 1.1 MW | 10.4 MW | 9.33 MW | 9 kg/s | 8.5 |

To achieve a secondary heat source according to the circuit of FIG. 4, an identical heat pump working at half the flow rate is sufficient.

Figure 6:
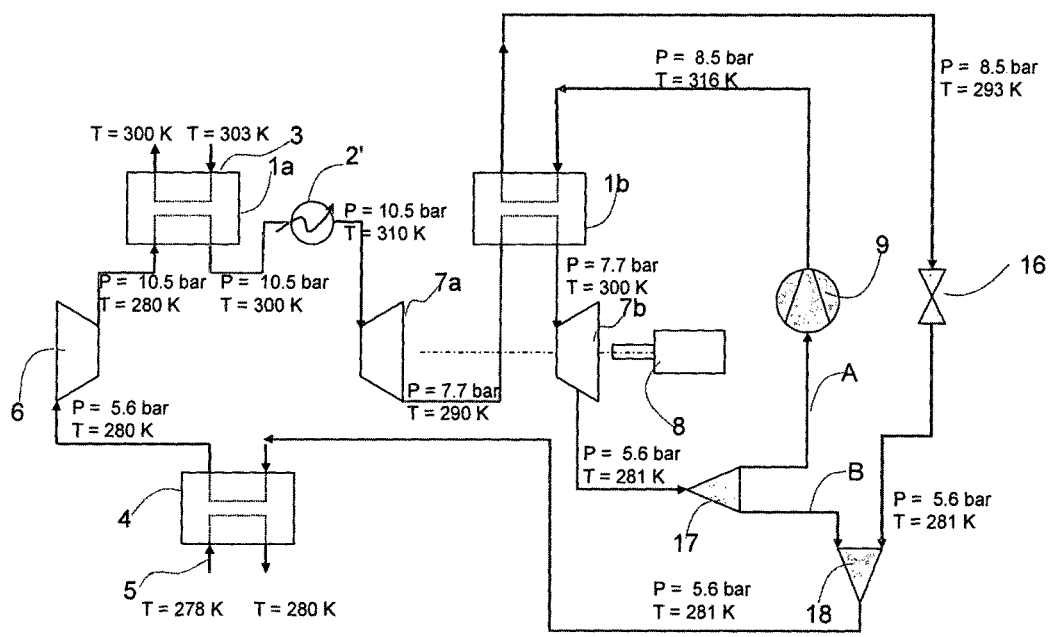
FIG. 6 illustrates an alternative embodiment of a heat exchange between two turbine stages.

FIG. 6 illustrates another alternative embodiment where the secondary heat source is a portion of the motive fluid. The gaseous NH3 motive fluid at the outlet of second turbine 7b (LP) is separated into two portions in a flow splitter 17, with about 4% secondary flux circulating in line A and 96% in line B.

Line A leads to a compressor 9 and the secondary flux exchanges heat in exchanger 1b upstream from second turbine 7b and downstream from first turbine 7a. The secondary flux is then expanded in a valve 16 prior to being recombined with the main flux in a mixer 18.

FIG. 6 gives by way of example the pressure and temperature values at various points of the secondary heat source circuit according to this variant. FIG. 6 illustrates an ocean thermal energy conversion system which performs a method an ocean thermal energy conversion (OTEC) comprising circulating a motive fluid in a closed loop between a deep cold ocean water source providing deep cold ocean water and a warm surface ocean water source providing warm surface ocean water, the deep cold ocean water source comprising a first heat exchanger disposed between the motive fluid and the deep cold ocean water and the warm water source comprising a second heat exchanger disposed between the motive fluid and the warm surface ocean water for heating the motive fluid from heat provided from the warm surface ocean water; compressing the motive fluid circulating in the loop downstream from an outlet of the first heat exchanger; heating the compressed motive fluid circulating in the loop with the second heat exchanger to be at least substantially vaporized at an outlet thereof; heating the substantially vaporized motive fluid circulating in the loop downstream from the outlet of the second heat exchanger with a secondary heat source; recovering thermal energy with a first and a second turbine stage from the heated substantially vaporized motive fluid circulating in the closed loop which has been heated by the secondary heat source and second heat exchanger; and condensing the motive fluid flowing in the closed loop through the deep cold ocean water source, and wherein the secondary heat source is a heat pump; heating the motive fluid in a third heat exchanger downstream from the first turbine stage and upstream from the second turbine stage; and splitting the motive fluid downstream from the turbine stages into a first portion and a second portion, compressing the first portion and recirculating the compressed first portion back to the third heat exchanger to transfer heat to the motive fluid flowing through the third heat exchanger, expanding the first portion downstream from the third heat exchanger, and combining the first portion with the second portion.

One of the portions A is compressed in compressor 9 and recirculated to heat exchanger 1b to heat the motive fluid therein and then expanded in valve 16 and recombined with portion B.

The invention claimed is:

1. An ocean thermal energy conversion (OTEC) method comprising:
    circulating a motive fluid in a closed loop between a deep cold ocean water source providing deep cold ocean water and a warm surface ocean water source providing warm surface ocean water, the deep cold ocean water source comprising a first heat exchanger disposed between the motive fluid and the deep cold ocean water and the warm water source comprising a second heat exchanger disposed between the motive fluid and the warm surface ocean water for heating the motive fluid from heat provided from the warm surface ocean water;
    compressing the motive fluid circulating in the loop downstream from an outlet of the first heat exchanger;
    heating the compressed motive fluid circulating in the loop with the second heat exchanger to be at least substantially vaporized at an outlet thereof;
    heating the substantially vaporized motive fluid circulating in the loop downstream from the outlet of the second heat exchanger with a secondary heat source;
    recovering thermal energy with a first and a second turbine stage from the heated substantially vaporized motive fluid circulating in the closed loop which has been heated by the secondary heat source and second heat exchanger; and
    condensing the motive fluid flowing in the closed loop through the deep cold ocean water source, and wherein the secondary heat source is a heat pump;
    heating the motive fluid in a third heat exchanger downstream from the first turbine stage and upstream from the second turbine stage; and
    splitting the motive fluid downstream from the turbine stages into a first portion and a second portion, compressing the first portion and recirculating the compressed first portion back to the third heat exchanger to transfer heat to the motive fluid flowing through the third heat exchanger, expanding the first portion downstream from the third heat exchanger, and combining the first portion with the second portion.

2. A conversion method as claimed in claim 1, wherein: the deep cold ocean water source includes a closed loop containing a refrigerant which thermally exchanges heat with the deep cold ocean water.

3. An ocean thermal energy conversion (OTEC) system comprising:
    means for providing closed-loop circulation of a motive fluid between a deep cold ocean water source providing deep cold ocean water and a warm surface ocean water source providing warm surface ocean water, the deep cold ocean water source including a first heat exchanger disposed between the motive fluid circulating in the closed loop and the deep cold ocean water and the warm surface ocean water source including a second heat exchanger disposed between the motive fluid circulating in the closed loop and the warm surface ocean water;
    means for providing compression of the motive fluid circulating in the closed loop;
    the second heat exchanger heats the motive fluid so that the motive fluid is substantially vaporized at an outlet of the second heat exchanger;
    a secondary heat source disposed downstream from the outlet of the second heat exchanger for heating the substantially vaporized motive fluid circulating in the closed loop;
    means for recovering thermal energy from the heated substantially vaporized motive fluid; and
    the first heat exchanger condenses the motive fluid circulating in the closed loop downstream from the means for recovering thermal energy; and wherein
    the secondary heat source is a heat pump;
    the means for recovering thermal energy from the heated substantially vaporized motive fluid circulating in the loop comprises two turbine stages;
    the system further comprising a third heat exchanger disposed between the two turbine stages; and
    a means for splitting the motive fluid downstream from the turbine stages into a first portion and a second portion, a compressor for compressing and circulating the first portion in the closed loop back to the third heat exchanger to transfer heat to the motive fluid flowing through the third heat exchanger, a means for expanding the first portion downstream from the third heat exchanger, and a mixer for combining the first portion with the second portion.

4. A conversion system as claimed in claim 3, wherein: the deep cold ocean water source comprises a closed loop containing a refrigerant fluid that exchanges thermal energy between the motive fluid and the deep cold ocean water.

* * * * *